US00RE35445E

United States Patent [19]

Pora

[11] E Patent Number: Re. 35,445

[45] Reissued Date of Patent: Feb. 11, 1997

[54] PACKAGING SYSTEM FOR MEDICATION

[75] Inventor: Raymond I. Pora, Brookfield, Ill.

[73] Assignee: UDL Laboratories, Inc., Rockford, Ill.

[21] Appl. No.: 445,778

[22] Filed: May 22, 1995

Related U.S. Patent Documents

Reissue of:

[64] Patent No.: 5,242,055
Issued: Sep. 7, 1993
Appl. No.: 982,484
Filed: Nov. 27, 1992

[51] Int. Cl.[6] ..... A61J 1/00; B65D 85/58

[52] U.S. Cl. ..... 206/532; 206/459.5; 206/534

[58] Field of Search ..... 206/461–472, 206/459.5, 528–540

[56] References Cited

U.S. PATENT DOCUMENTS

| | | | |
|---|---|---|---|
| Re. 29,705 | 7/1978 | Compere . | |
| 1,038,703 | 9/1912 | Wood | 206/425 |
| 1,729,126 | 9/1929 | Reimer | 206/425 |
| 2,415,859 | 2/1947 | Ancker . | |
| 3,054,503 | 9/1962 | Hartman, Jr. et al. . | |
| 3,387,699 | 6/1968 | Heller . | |
| 3,472,368 | 10/1969 | Hellstrom . | |
| 3,503,493 | 3/1970 | Nagy . | |
| 3,630,346 | 12/1971 | Burnside . | |
| 3,659,706 | 5/1972 | Serrell | 206/532 |
| 3,780,856 | 12/1973 | Braverman . | |
| 3,809,220 | 5/1974 | Arcudi . | |
| 3,811,564 | 5/1974 | Braber . | |
| 3,835,995 | 9/1974 | Haines . | |
| 3,899,080 | 8/1975 | Brunda . | |
| 3,910,487 | 10/1975 | Jaeschke | 206/425 |
| 3,912,081 | 10/1975 | Haines et al. . | |
| 3,912,082 | 10/1975 | Gerner et al. | 206/469 |
| 3,924,746 | 12/1975 | Haines . | |
| 3,924,748 | 12/1975 | Braverman . | |
| 3,933,245 | 1/1976 | Mullen . | |
| 3,941,248 | 3/1976 | Moser et al. . | |
| 4,243,144 | 1/1981 | Marguilies . | |
| 4,294,361 | 10/1981 | Marguilies et al. . | |
| 4,340,141 | 7/1982 | Fischer | 206/528 |
| 4,506,789 | 3/1985 | Dlugosz | 206/532 |
| 4,974,729 | 12/1990 | Steinnagel | 206/531 |
| 5,046618 | 9/1991 | Wood | 206/532 |
| 5,050,739 | 9/1991 | Hannan et al. | 206/531 |
| 5,169,001 | 12/1992 | Scheibel | 206/531 |

OTHER PUBLICATIONS

Photographs J and K of a Norgesic–Forte package.
Photographs A, B, and C of a Mortin Package.
Photograph D, E, and F of a Suprol package.
Photographs G, H, and I of a Disalcid package.
Photographs L and M of a Deconamine package.
Photographs N, O, and P of an unlabeled package.
The laminate design of the carrier 50 with slits 130 and 140 shown in the instant patent application in FIG. 5A.

*Primary Examiner*—Jimmy G. Foster
*Attorney, Agent, or Firm*—Dressler, Goldsmith, Milnamow & Katz, Ltd.

[57] ABSTRACT

A sealed package is provided for holding a predetermined supply of individual medication units, such as pills. The package includes a base panel defining a predetermined number of sealed compartments. The base panel includes opening means for accommodating the tearing of the base panel from an edge thereof into each compartment to release the pills. A cover panel is provided for overlying the base panel and is hinged to the base panel. A retainer means or latch is provided for releasably engaging the cover panel with the base panel. The cover panel, the base panel, or both present indicia for identifying said medication units and the [and] dosage therefor.

9 Claims, 4 Drawing Sheets

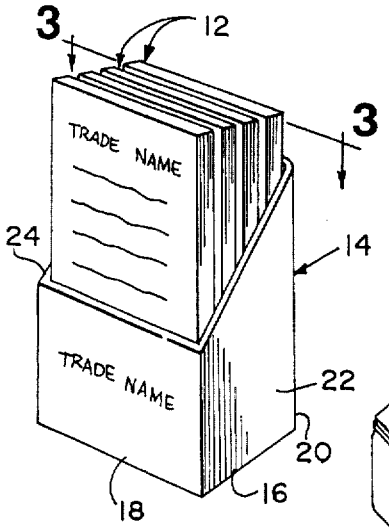
Fig. 1
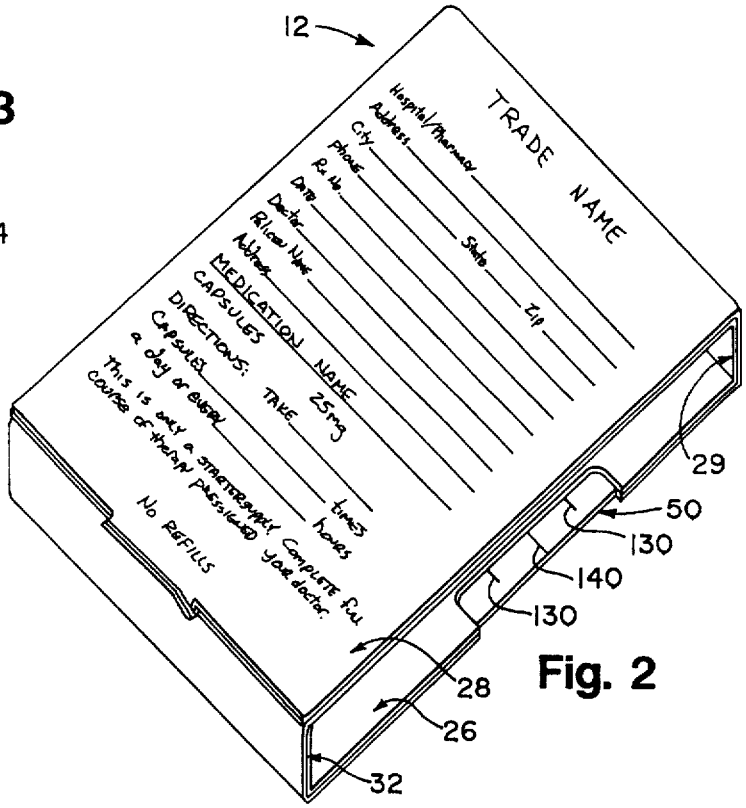
Fig. 2
Fig. 3
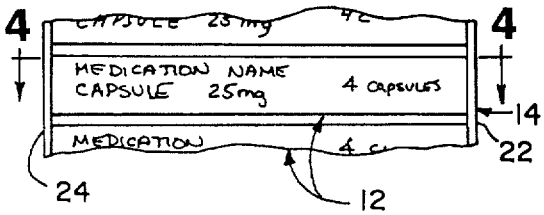
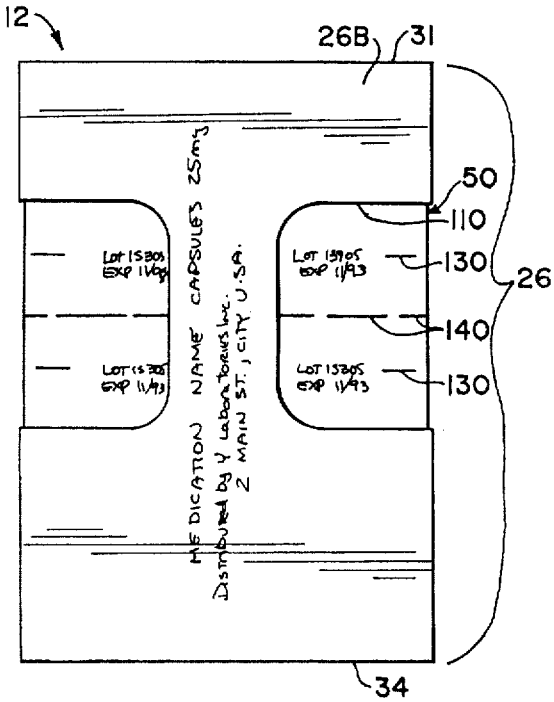
Fig. 4

Fig. 7
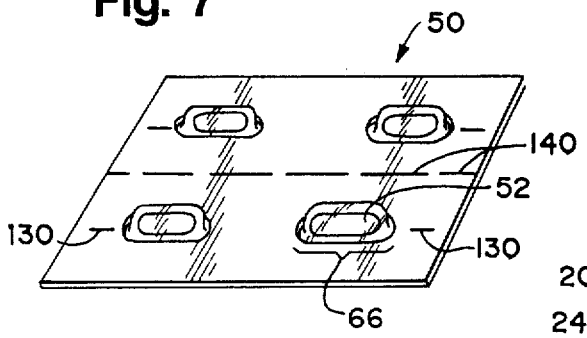
Fig. 9
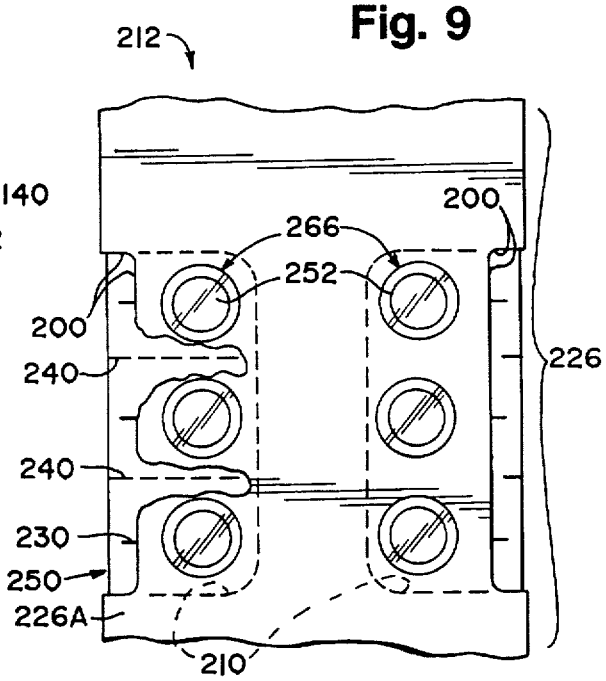
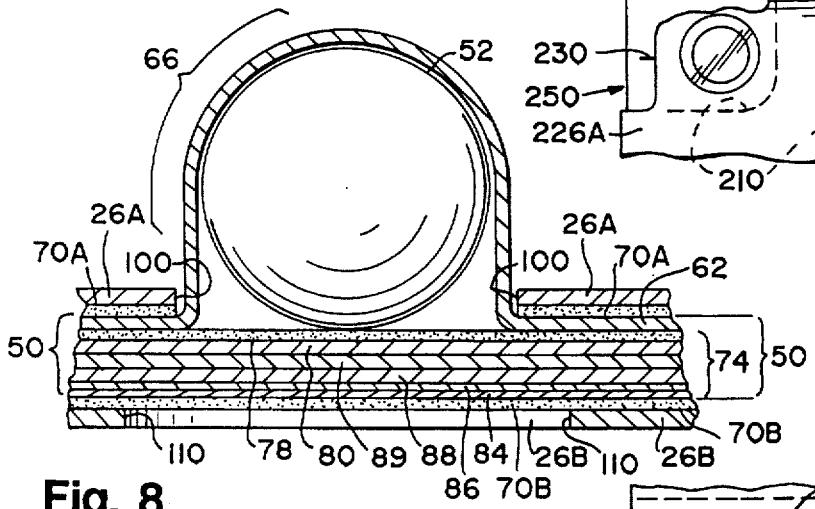
Fig. 8
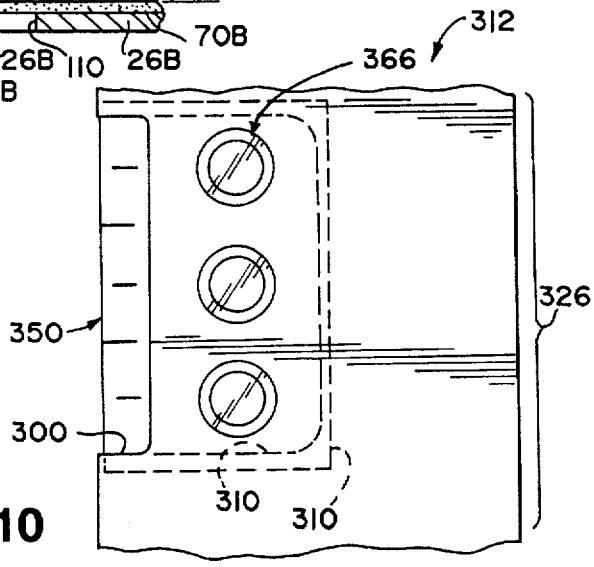
Fig. 10

PACKAGING SYSTEM FOR MEDICATION

Matter enclosed in heavy brackets [ ] appears in the original patent but forms no part of this reissue specification; matter printed in italics indicates the additions made by reissue.

TECHNICAL FIELD

The present invention relates to a package from which a predetermined supply of individual medication units, such as pills, can be dispensed, and the invention more particularly relates to such packages of the type which are sealed and difficult for children to open.

BACKGROUND OF THE INVENTION AND TECHNICAL PROBLEMS POSED BY THE PRIOR ART

A variety of medications, including drugs and the like, are provided in the form of solid or liquid medication units, including pills which may be defined as including tablets, capsules, caplets, lozenges, etc. Although a variety of packaging arrangements have been provided or proposed for such medication units it would be desirable to provide an improved packaging system which would aid in the proper administration of the medication.

For example, a patient should be able to conveniently carry and use the package. Further, the package should permit the medication to be readily identified by both the distributor or the medication and the patient, and the package should minimize the likelihood or a child accidentally ingesting the medication.

Also, it would be desirable to provide an improved package which has a structure for facilitating the effective display of patient instructions and warnings relating to the medication.

Although it is possible for an institution, such as a hospital, to procure medication in bulk form and then prepare individual doses from a bulk supply, there are a number of reasons why such a method or medication administration is not desirable. In particular, in view of rising health care costs, there is a need to reduce costs by eliminating or reducing labor-intensive tasks relating to medication administration. Thus, it would be advantageous to provide a method of medication administration which does not require personnel at a hospital or physician's office to prepare one or more individual doses from a bulk supply of medication.

It would also be beneficial to provide an improved system in which a limited, predetermined number of doses can be provided in advance to a patient for use by the patient during a subsequent time period. For example, in some countries, regulations regarding the administration of drugs require that a patient who is treated as a hospital out-patient, or who is released from a hospital emergency room, be given no more than a 24 hour supply of a prescription drug or general medication.

The patient must have a prescription filled by a registered pharmacist to obtain an additional supply of the drug. Thus, it would be desirable to provide an improved package for such a 24 hour supply of a prescription drug or general medication.

Such a system for accommodating a predetermined supply of medication should also desirably permit the dispensed medication to be traced and controlled from the administering source, such as the drug manufacturer, through the administering agent e.g., hospital or physician) to ultimate consumption by the patient.

It would also be desirable to provide an improved package which would accommodate identification or labeling or the medication as well as identification and labeling of the patient's name and other patient-related data. This may help to prevent confusion or mix up of the medication with the medication of other patients.

Such an improved medication package should also advantageously accommodate the maintenance of records which may have to be kept by the administering agent (e.g., hospital or physician) with respect to dispensing of the medication.

Advantageously, such an improved medication package should be easily processed in conventional medication inventory systems and in reordering or restocking operations. Further, it would be desirable if such an improved package could be easily used with institutional data processing systems for patient billing, patient monitoring, and the like.

It would also be beneficial if such an improved package could be provided in a form that could accommodate date efficient packing, shipping, handling, storage, end dispensing with a minimum of wasted space.

Preferably, such an improved package should also protect the mediation and yet be relatively light weight and have a configuration that is unlikely to snag objects when being removed from a patient's purse or pocket.

Preferably, such an improved package should also seal each individual dose of the medication.

Advantageously, the package design should permit, where desired, the construction of the package in a form that is sufficiently difficult to open so as to greatly inhibit or prevent a child from gaining access to one or more of the medication doses.

The present invention provides an improved unit dose package which can accommodate designs having the above-discussed benefits and features.

SUMMARY OF THE INVENTION

The present invention provides a novel unit dose packaging system or arrangement for medication. It is particularly suitable for use in hospital emergency departments. The package holds a supply of a predetermined number of individual solid or liquid medication units, such as pills. Preferably, the medication units to be dispensed to a patient over a selected time period are each provided in separate, heat-sealed compartments in the package. In a preferred form of the invention, each compartment is at least somewhat difficult for a child to open.

One form of the package of the present invention includes a base panel that defines a predetermined number of sealed compartments corresponding to the number of pills or other forms of medication to be dispensed to a patient in a predetermined period. Each compartment contains one of the medication units. The base panel further includes opening means for accommodating the tearing of the base panel from an edge thereof into the compartments to release the medication.

A cover panel is provided for overlying the base panel, and a hinge means is provided for connecting the cover panel and base panel to accommodate relative movement of the cover panel and base panel between open and closed configurations.

A retainer means is provided for releasably engaging the cover panel with the base panel when the cover panel and base panel are in the closed configuration.

The cover panel and/or base panel preferably present indicia means for identifying the medication units and dosage therefor.

In a preferred form of the invention, the package holds a predetermined number of medication units which are to be dispensed to a patient in a 24 hour period. This form of the package is especially suitable for use by hospital emergency departments. The emergency department can treat a patient and then release the patient with a 24 hour supply of a medication conveniently contained in the novel package. Such a package may also be conveniently used by psychiatric hospitals which can provide such a package to a patient when temporarily discharged on a leave, such as a week-end leave.

According to another aspect of the invention, the package is provided with a unique sheath layer configuration associated with medication-containing compartments. As described above, a base panel is provided to define a predetermined number of sealed compartments corresponding to the number of discrete solid or liquid medication units (e.g., pills) to be dispensed. Each compartment contains one of the medication units.

A cover panel overlies the base to accommodate relative movement of the cover panel and base panel between open and closed configurations.

The compartments in the base panel are spaced apart in a row inwardly of one edge of the base panel. The base panel further defines a plurality of spaced-apart weakened zones. Each weakened zone is associated with one of the compartments and is each located between the compartment and the edge of the base panel.

The base panel also includes a carder, and the carrier includes a transparent medication unit-receiving member having a row of outwardly projecting receptacles.

The receptacles have openings on one side for defining the compartments for receiving the medication. The carrier includes a backing sheet sealed to the transparent medication-receiving member and covering each receptacle opening.

The base panel further includes top and bottom sheath layers on opposite sides of the carrier. The top sheath layer includes a plurality of apertures for each receiving one of the receptacles and accommodating the projections of the receptacles through the apertures.

The bottom sheath layer has a bottom notch along the one edge of the base panel. The bottom notch extends inwardly beyond the compartments to expose the backing sheet below the compartment.

The top sheath layer has a top notch along the one edge of the base panel, and the top notch extends inwardly from the one edge beyond the weakened zones but terminates outwardly of the compartments so that the top sheath layer defines a land between the apertures and the top notch. The weakened zones facilitate tearing of the package to gain access to the medication.

The package of the present invention provides a system for supplying a desired amount of medication in a convenient, easy-to-use package. The system is effective in protecting the medication, inhibiting access to the medication by children, accommodating identification of the medication and recordation of data relating to the patient, facilitating storage and handling, and serving as a means for displaying instructions and other indicia.

Numerous other advantages and features of the present invention will become readily apparent from the following detailed description of the invention, from the claims. and from the accompanying drawings.

BRIEF DESCRIPTION OF THE DRAWINGS

In the accompanying drawings that form part of the specification, and in which like numerals are employed to designate like parts throughout the same, FIG. 1 is a perspective view of a plurality of packages of the present invention shown disposed in a container in accordance with the teachings of one aspect of the present invention;

FIG. 2 is an enlarged, perspective view of one of the packages of the present invention;

FIG. 3 is a greatly enlarged, fragmentary, top plan view taken generally along the plane 3—3 in FIG. 1;

FIG. 4 is a rear, elevational view of a package taken is generally along the plane 4—4 in FIG. 3 with the sides of the container omitted for ease of illustration;

FIG. 7 is a perspective view of a scaled carrier prior to assembly with the piece of paperboard illustrated in FIG. 6;

FIG. 8 is a greatly enlarged, fragmentary, cross-sectional view taken generally along the plane 8—8 in FIG. 5;

FIG. 9 is a fragmentary, plan view of a base panel of a second embodiment of the package of the present invention; and FIG. 10 is a view similar to FIG. 9 but showing a base panel of a third embodiment of the package of the present invention.

DESCRIPTION OF THE PREFERRED EMBODIMENTS

Figures 5, 5A:
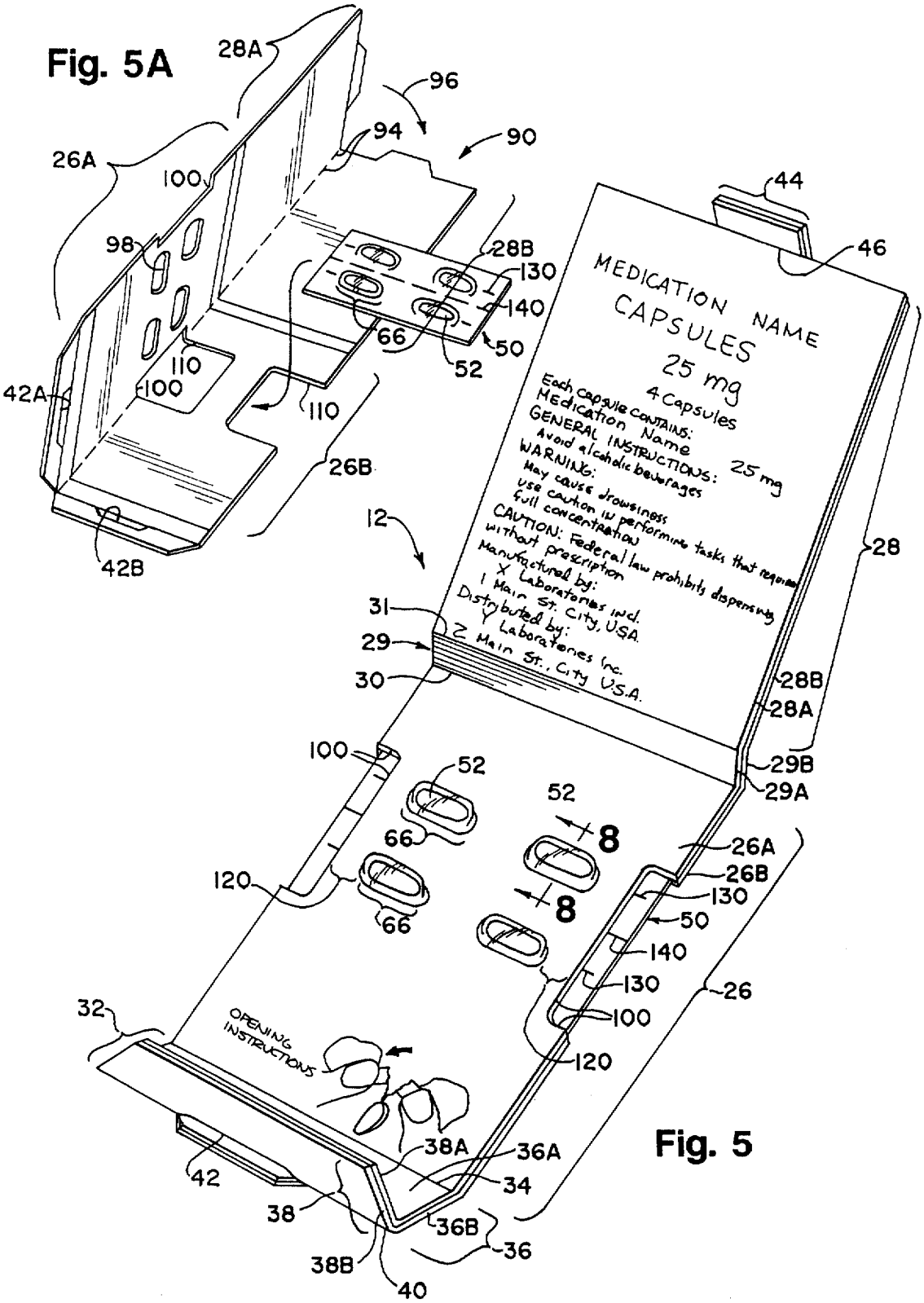
FIG. 5 is a view similar to FIG. 2 but showing the package in tn opened configuration.
FIG. 5A is an exploded, perspective view of the components of the package shown prior to assembly.

While this invention is susceptible of embodiment in many different forms, this specification and the accompanying drawings disclose only some specific forms as examples of the invention. The invention is not intended to be limited to the embodiments so described, however. The scope of the invention is pointed out in the appended claims.

For ease of description, the package of this invention is described in typical use positions, and terms such as upper, lower, horizontal, etc., are used with reference to these positions. It will be understood, however, that so the package of this invention may be manufactured, stored, transported, used, and sold in an orientation other than the positions described.

A first embodiment of the package of the present invention is illustrated in FIGS. 1–8, and a plurality of such packages are designated generally by the reference numeral 12 in FIG. 1 wherein the packages 12 are stored in a generally upright, vertical configuration within a container 14. Each package 12 has a generally thin, right rectangular parallelpiped shape (in the closed configuration as illustrated in FIG. 1). The packages 12 are arranged seriatim in a row in the container 14 with the front panel or cover panel of one package being in face-to-face registration with the rear or base panel of an adjacent package.

The container 14 has a base 16, a front wall 18, a rear wall 20, and a pair of opposed side walls 22 and 24. The container walls 18, 20, 22, and 24 extend upwardly from the base 16 to define an opening for receiving the vertically disposed packages 12. The rear wall 20 is taller than the front wall 18.

Each wall has a top edge, and the top edge of the rear wall 20 is generally parallel to the top edge of the front wall 18 and to the base 16. The top edges of the side walls 22 and 24 extend at an oblique angle relative to the base 16 and connect the top edge of the front wall 18 with the top edge of the rear wall 20.

The novel structure of the container 14 permits a plurality of packages 12 to be efficiently packed and stored within the container 14. Further, the container 14 permits the packages 12 to be easily removed from the container one at a time, or in groups of more than one.

A plurality of containers 14, each containing a full load of packages 12, may be conveniently packed in a larger carton (not illustrated) of a suitable conventional or special type.

The container 14 may be provided with indicia on the exterior surfaces, such as with textual and pictorial information relating to the medication, manufacturer, storage, instructions, warnings, etc.

A package 12 is shown in the closed configuration in FIG. 2. The package 12 includes a base panel 26 and a cover panel 28. A hinge panel or hinge means 29 connects the cover panel 28 and the base panel 26 to accommodate relative movement of the cover panel and base panel between a closed configuration (FIG. 2) and an open configuration (FIG. 5). As shown in FIG. 5, the hinge means 29 includes a short wall, panel, or member connected at one end to the base panel 26 along a fold line 30 and connected at the other end to the cover panel 28 along a fold line 31.

As best illustrated in FIG. 5, the package 12 includes a generally L-shaped closure wall 32 connected along a bend line or hinge line 34 to one end of the base 26. The closure wall 32 includes a first leg 36 and a second leg 38 connected to the first leg 36 at a hinge or bend line 40. A centrally disposed slit or slot 42 is defined along the bend line 40 for receiving a latch tab 44 extending from the distal end of the cover panel 28. The latch tab 0 44, extends in a substantially perpendicular orientation from, and relative to, the plane of the cover panel 28 along a bend line 46. When the package 12 is closed, the tab 44 may be inserted through the slit 42. The tab 44 and latch wall 32 may be characterized as defining a retainer means for releasably engaging the cover panel with the base panel.

Preferably, the base panel 26 and/or cover panel 28 may be used to display textual and/or pictorial material or other indicia means for identifying the medication and the dosage therefor, and for providing other information, such as the name of the manufacturer, etc. For example, the base panel 26 (FIG. S) displays a diagram illustrating how the sealed medication may be accessed.

As illustrated in FIGS. 5, 5A, 7, and 8, the base panel 26 includes a carrier 50 for holding the medication, such as pills 52, in a sealed condition. The base panel 26 includes a unique structure for retaining the carrier 50.

In particular, the base panel 26 includes a top sheath layer 26A on the top of the carrier 50 and a bottom sheath layer 26B on the bottom of the carrier 50.

As best illustrated in FIG. 8, the carrier 50 includes a transparent medication-receiving member 62 having a row of outwardly projecting blisters or receptacles 66 which open on one side (downwardly with reference to FIG. 8) for defining compartments for receiving the solid or liquid medication, such as tablets, capsules, caplets, lozenges, quantities of liquid medication, or pills 52, during manufacture of the carrier 50. Each compartment 66 formed in the transparent, medication-receiving member 62 may be alternatively characterized as a cavity or chamber. The transparent medication-receiving member 62 may be of conventional design and thermo-formed from a suitable polyvinyl chloride polymer having a typical thickness of about 10 mils and which may include a conventional ultra-violet inhibitor.

The upper surface of the medication-receiving member 62 is preferably heat sealed to the lower surface of the top sheath layer 26A with an intermediate, heat-activated, heat seal coating 70A which my be of any suitable conventional type well-known to those of skill in the art.

The carrier 50 also includes a backing sheet or foil laminate 74 which is sealed to the transparent medication-receiving member 62 for covering each receptacle opening. The backing sheet 74 may be of say suitable special or conventional design.

In the preferred embodiment illustrated, the backing sheet 74 is of a conventional type and includes a heat-activated, heat heat seal coating 78 for heat sealing the backing sheet 74 to the underside of the medication-receiving member 62. The heat seal coating 78 is carried on the top surface of a metal foil layer 80. In the preferred embodiment, the foil layer 80 has a thickness ofabout 0.001 inch, and the heat seal coating 78 is applied to the foil layer 80 at a coverage of about 3 pounds per ream.

The bottom surface of the foil layer 80 is bonded to a paper layer 84 with three, intermediate, polymer layers. 86, 88, and 89. The paper layer 84 is preferably a conventional 25 pound, sulfite, pouch paper. The layer 86 is polyethylene at about 10.8 pounds per ream. The layer 88 is polyethylene terephalate with a thickness of about 50 gauge. The layer 89 is polyethylene at about 10.8 pounds per ream. The bottom of the paper layer 84 of the backing sheet 74 is bonded with a heat-activated, heat seal coating 70B to the upper surface of the bottom sheath layer 26B.

In the preferred embodiment illustrated, the sheath layer 26A and bottom sheath layer 26B are each preferably formed from solid, bleached sulfite paperboard board ("SBS board"). Preferably, the base panel bottom sheath layer 26B and base panel top sheath layer 26A are both defined by a single piece of paperboard 90 which is folded over the carrier 50 as illustrated in FIG. 5A.

Figure 6:
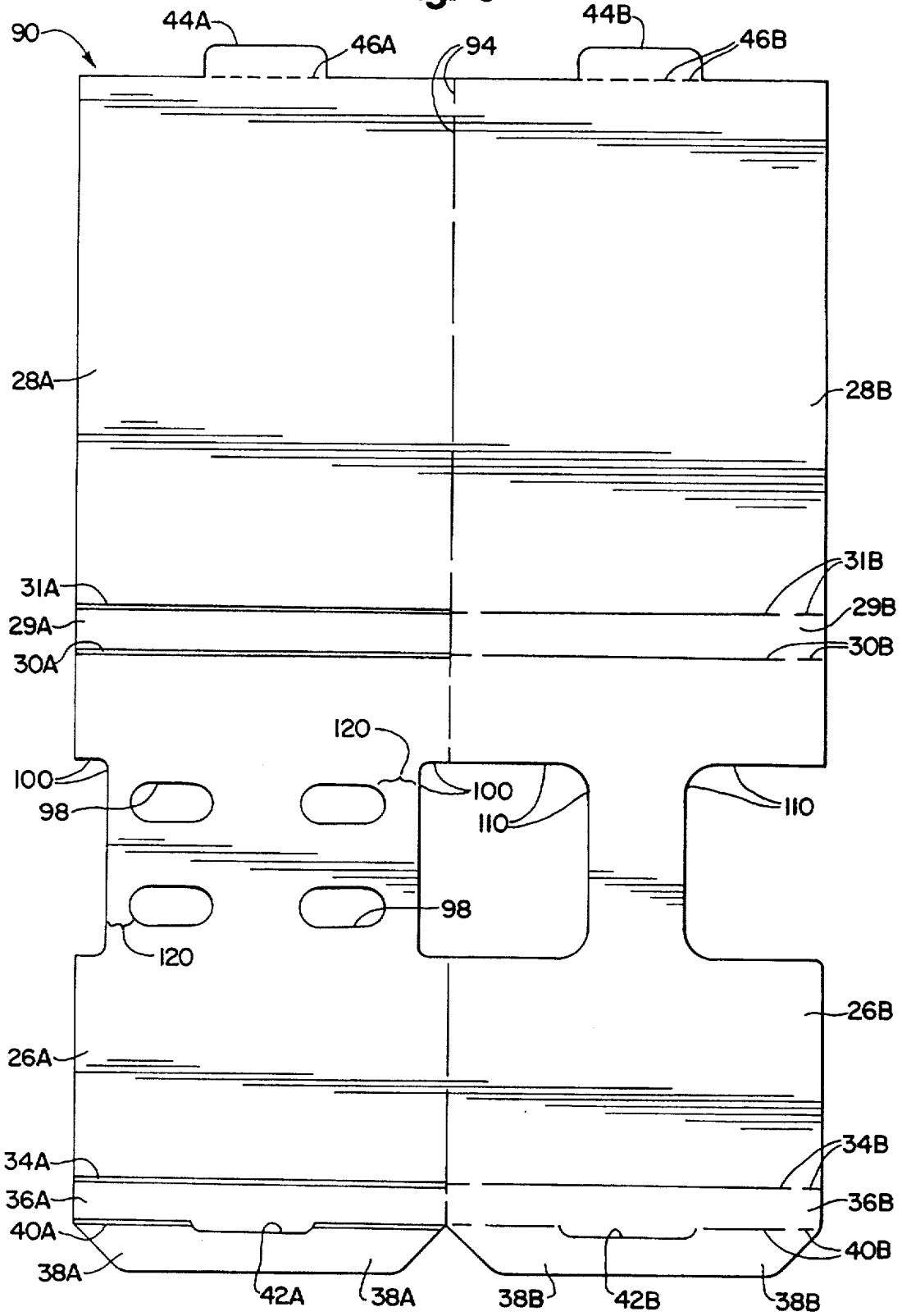
FIG. 6 is a greatly enlarged, plan view of a piece of paperboard prior to being assembled with, and folded over, other components of the package.

During manufacture, the single, paperboard piece 90 is die cut or otherwise formed in an unfolded, flat condition as illustrated in FIG. 6. The single paperboard piece 90 includes a longitudinal fold line defined by a plurality of spaced-apart slits 94. The paperboard piece 90 can be folded over along the fold line slits 94 in the direction of the arrow 96 as illustrated in FIG. 5A.

With reference to FIG. 6, the top sheath layer 26A is defined on one side of the fold line slit 94, and the bottom sheath layer 26B is defined on the other side of the fold line slit 94. A portion 36A of the paperboard piece 90 is connected 1o the distal end of the top sheath layer 26A along a fold line 34A, and a flap portion 38A extends from the portion 36A along a fold line 40A. The fold lines 34A and 40A are of the conventional type having a raised area (facing upwardly toward the viewer in FIG. 6) on one side of the paperboard piece 90 and having a shallow groove (facing downwardly away from the viewer FIG. 6) paperboard piece 90.

At the distal end of the bottom sheath layer 26B there are spaced-apart, transverse fold line slits 34B and 40B which are adapted to lie in registration with the fold lines 34A and 40A, respectively, when the paperboard piece 99 is folded over along the fold line slits 94.

The fold line 40A is interrupted with a slit 42A, and the spaced-apart fold line slits 40B are interrupted with a continuous slit 41B. When the single paperboard piece 90 is folded over, the slits 42A and 42B define the tab-receiving slot 42 (FIG. 5).

The middle of the single paperboard piece 90 defines a inner hinge wall 29A on one side of the fold line slits 94 and defines an outer hinge wall 29B on the other side of the fold line slits 94. The inner hinge wall 29A is connected to one end of the top sheath layer 26A via a fold line 30A and is connected on the other end to an inner cover portion 28A along a fold line 31A. The structure of the fold lines 30A and 31A may be of any suitable conventional or special design. The fold lines 30A and 31A each preferably have a structure identical to that of the fold lines 34A and 40A described above.

The outer hinge wall 29B is connected to the bottom sheath layer 26B along a fold line defined by slits 30B and is connected to an outer cover portion 28B along a fold line defined by slits 31B. The fold lines defined by the slits 3lB and 30B are adapted to be in registration with the fold lines 31A and 10B, respectively, when the single paperboard piece 90 is folded over along the longitudinal fold line defined by the slits 94.

A tab member 44A extends from the distal end of the inner cover portion 28A at a fold line 46A. A tab member 44B extends from the distal end of the outer cover portion 28B along a fold line defined by slits 46B. When the single paperboard piece 90 is folded over about the longitudinal fold line defined by the slits 94, the tab members 44A and 44B lie in registration to form the tab 44 (FIG. 5).

As shown in FIGS. 5A and 6, the single paperboard piece 90 has a unique cut-out configuration for receiving the carrier 50. In particular, the top sheath layer 26A defines a plurality of apertures 98 for each receiving one of the carrier receptacles 66 and for each accommodating the projection of a receptacle through the aperture.

Further, the top sheath layer 26A defines a top notch 100 along each side edge, and the bottom sheath layer 26B defines a bottom notch 110 along each side edge.

When the single paperboard piece 90 is folded over on the carrier 50 so that the receptacles 66 project through the apertures 98, the lateral edges of the carrier 50 extend into the regions of the notches 100 and 110. As illustrated in FIGS. 5A and 6, the top sheath layer notches 100 are not as deep as the bottom sheath layer notches 110. Thus, a relatively greater area of the bottom of the carrier 50 is exposed in the notches 110 on the bottom of the package (as illustrated in FIG. 4) compared to the area of the carrier exposed through the lateral notches 100 in the top sheath layer 26A as shown in FIG. 5.

When the carrier 50 is assembled in the folded over paperboard piece 90, the assembly is secured in that position. To this end, the above-described heat-activated heat seal coating extends over the mating surfaces of the paperboard piece 90 (i.e., over the entire surface of the paperboard piece 90 as viewed in FIG. 6). This heat seal coating is seen as layers 70A and 70B in FIG. 8. Suitable conventional thermal pressing techniques may be employed to thermally bond the components together.

The paperboard piece notches 100 and 110 cooperate with features on the carrier 50 to define a unique structure which children find difficult to open. In particular, the medication-receiving compartments defined by the receptacles 66 in the carrier 50 are spaced-apart in two parallel rows. Each row of receptacles 66 is spaced inwardly of an adjacent edge of the base panel 26 (FIG. 5). Further, each row of receptacles 66 is spaced inwardly of the adjacent notch 100 (FIG. 5). Each notch 100 extends laterally inwardly from the adjacent edge of the base panel 16 beyond the lateral edge of the carrier 50 but terminates laterally outwardly of the receptacles 66 so that the top sheath layer 26A defines a land or region 120 (FIG. 5) between the receptacles 66 and the notch 100. Each land 120 may thus be characterized as extending between a row of apertures 98 and an adjacent notch 100.

In order to gain to a pill 52 or other type of medication unit, the edge of the carrier 50 can be torn, in the location of the notch 100, inwardly to a receptacle 66. The manner in which the carrier 50 can be torn is illustrated in the diagram shown on the surface of the top sheath 26A in FIG. 5. In one form of the present invention, the laminate structure of the carrier 50 is preferably made sufficiently strong so as to inhibit a small child from tearing through the carrier to gain access to the pills 52. Much of the resistance to tearing is provided by the transparent, polyvinyl chloride layer 62 (FIG. 8) and the foil laminate backing sheet 74 (FIG. 8).

Typically, tearing of the polyvinyl chloride layer 62 and foil backing sheet 74 would be difficult even for an adult. Accordingly, a weakened zone is provided between each receptacle 66 and the lateral edge of the carrier 50. In the preferred embodiment illustrated, the weakened zone is in the form of a perforation or slit 130. Other suitable weakened zone structures may be employed, such as a weakened line, tear zone, or other frangible region. Preferably, the slit 130 does not extend all the way to the lateral edge of the carrier 50 and does not extend all the way to the receptacle 66. In one contemplated embodiment, the distance between the end of slit 130 and the edge of the carrier is 3/64 inch. Thus, considerable effort is required to initially tear the portion of the carrier 50 between the lateral edge of the carrier 50 and the slit 130. This effort is typically much greater than can be exerted by a child. Thus, this preferred form of the package can be characterized as being difficult for children to open.

In order to assist in removal of a pill 52 from its receptacle 66, the back of the compartment defined by the receptacle 66 is not covered by the bottom sheath layer 26B. Specifically, with reference to FIGS. 4, 5A, and 6, it can be seen that the notch 110 on each side of the bottom sheath layer 26B extends inwardly a substantial distance from the lateral edge of the bottom sheath layer 26B. Thus, the transparent member 62 and foil laminate 74 (FIG. 8) can be torn into the compartment or receptacle 66 without having to tear the bottom sheath layer 26B.

Preferably, in order to assist in separating previously opened receptacles 66 from those that have not yet been opened, suitable tear lines, such as spaced-apart slits or perforations 140 (FIGS. 4 and 5A), are provided between each transverse row of receptacles 66. Thus, used portions of the carrier 50 can be torn away.

The large cut out region defined by each bottom sheath layer notch 110 exposes a large area of the bottom of the carrier 50, and information can be printed on the bottom surface of the carrier 50 in the notch region below each pill or other form of medication. Typically, such information will include manufacturing data such as product lot or number, expiration date, and the like.

Also, the bottom surface of the bottom sheath layer 26B may desirably be provided with text material, such as information regarding the medication name, manufacturer, dosage, and the like.

FIG. 9 illustrates a second embodiment of the present invention wherein a package 212 is shown in an open position to expose a base panel 226 having a top sheath layer 226A. A carrier 250 is provided with a plurality of receptacles 266 each containing a medication dose, such as a pill 252. The receptacles 266 are disc-like in slope as opposed to the elongate, dome-like shape of the receptacles 66 for the first embodiment described above with reference to FIGS. 1-8.

The carrier 250 contains two longitudinal rows of receptacles 266, and there are three receptacles in each longitudinal row. As in the first embodiment, the top sheath layer 226A defines a top notch 200 along each side edge of the top sheath layer 226A. A bottom sheath layer (not visible in FIG. 9) defines a bottom notch 210 shown hidden in FIG. 9 (wherein the hidden notch 210 is represented by dashed lines).

The carrier 250 may have substantially the same laminate structure as the carrier 50 in the first embodiment described above with reference to FIGS. 1-8. To this end, a weakened zone or slit 230 is defined in the carrier 250 inwardly of the lateral edge of the carrier 250 adjacent each pill-receiving receptacle 266. The lateral rows of the receptacles 266 may be separated after opening by tearing along weakened zones defined by slits 240.

The package 212 may incorporate a hinged cover panel and retention means or latch (not illustrated) with configurations substantially identical to those employed for the cover panel and retention means of the first embodiment described above with reference to FIGS. 1-8.

A third embodiment of a package 312 is illustrated in FIG. 10. The package 312 is similar to the second embodiment of the package 212 described above with reference to FIG. 9 except that only one longitudinal row of pill-receiving receptacles 366 is provided. Accordingly, only one top notch 300 and bottom notch 310 are employed along one side edge of a package base panel 326. The receptacles 366 are defined by a carrier 350 which extends only part way across the base panel 326 and terminates in a rear edge [310] *311* in a central region of the base panel 326.

The novel package of the present invention provides a convenient system for permitting the administration of a predetermined supply of medication. The invention can be incorporated in a package which is difficult for children to open. The package protects the medication and provides the capability for displaying instructions or other information. The package can be readily handled and used, axed the package configuration accommodates efficient shipping and storage.

It will be readily apparent from the foregoing detailed description of the invention and from the illustrations thereof that numerous variations and modifications may be effected without departing from the true spirit and scope of the novel concepts or principles of this invention.

What is claimed is:

1. A sealed [,] package from which a predetermined supply of discrete units of medication can be dispensed, said package comprising:

a base panel defining a predetermined number of sealed compartments corresponding to the number of medication-units to be dispensed to a patient in a predetermined time period, each said compartment containing one of said medication units, said base panel further including opening means for accommodating the tearing of said base panel from an edge thereof into each said compartment to release said medication units;

said base panel further including:

(a) a carrier that has a transparent medication-receiving member that has a row of outwardly projecting receptacles defining said compartments for receiving said medication units; and (b) top and bottom sheath layers on opposite sides of said carrier;

said top sheath layer including a plurality of apertures for each receiving one of said receptacles and for accommodating the projection of said receptacles through said apertures;

said bottom sheath layer having a *bottom notch along said one side edge of said base panel, said bottom notch extending below said compartments to expose said carrier below said compartments;*

*said top sheath layer having a* top notch along said one edge of said base panel; and said top notch extending inwardly from said one edge but [terminates] *terminating* outwardly of said compartments so that said top sheath layer defines a land between said apertures and said top notch;

a cover panel for overlying said base panel;

a hinge means for connecting said cover panel and base panel to accommodate relative movement of said cover panel and base panel between open and closed configurations; and a retainer means for releasably engaging said cover panel with said base panel when said cover panel and base panel are in said closed configuration.

2. A sealed [,] package from which a predetermined supply of individual medication units can be dispensed, said package comprising:

a base panel defining a predetermined number of sealed compartments corresponding to the number of medication-units to be dispensed, each said compartment containing one of said medication units;

a cover panel for overlying said base panel to accommodate relative movement of said cover panel and base panel between open and closed configurations;

said compartments being spaced-apart in a row inwardly of one edge of said base panel, said base panel further defining a plurality of spaced-apart weakened zones which are each associated with one of said compartments and are each located between said one edge and said one compartment, said base panel including a carrier, said carrier including a transparent medication-receiving member having a row of outwardly projecting receptacles with openings on one side for defining said compartments for receiving said medication units, said carrier including a backing sheet sealed to said transparent medication-receiving member and covering each said receptacle opening; and said base panel further including top and bottom sheath layers on opposite sides of said carrier, said top sheath layer including a plurality of apertures for each receiving one of said receptacles and accommodating the projection of said receptacles through said apertures, said bottom sheath layer having a bottom notch along said one edge of said base panel, said bottom notch extending [inwardly beyond] *below* said compartments to expose said backing sheet below said compartments, said top sheath layer having a top notch along said one edge of said base panel, said top notch extending inwardly from said one edge beyond said weakened zones but terminating outwardly of said compartments so that said top sheath layer defines a land between said apertures and said top notch.

3. The package in accordance with claim 2 in which portions of said top sheath layer and said bottom sheath layer extend beyond said carrier and are sealed together at regions extending beyond said carrier.

4. The package in accordance with claim 2 in which said top sheath layer and said bottom sheath layer are each sealed to said carrier.

5. The package in accordance with claim 2 in which said cover panel includes a top layer and a bottom layer sealed together.

6. The package in accordance with claim 2 in which said base panel bottom sheath layer and said base panel top sheath layer are both defined by a single piece of paperboard folded over said carrier.

7. The package in accordance with claim 2 in which said cover panel includes a single piece of paperboard folded over upon itself to define both said cover panel top layer and said cover panel bottom layer.

8. The package in accordance with claim 2 in which each said weakened zone includes a perforation through said carrier.

9. The package in accordance with claim 8 in which each said perforation is a slit that is spaced inwardly of said one edge of said base panel.

* * * * *